United States Patent
Cosyn et al.

(10) Patent No.: US 10,713,965 B2
(45) Date of Patent: Jul. 14, 2020

(54) NEGATIVE LEARNING BEHAVIOR ALERT SYSTEM

(71) Applicant: McGraw-Hill Global Education Holdings, LLC, New York, NY (US)

(72) Inventors: Eric Emile Cosyn, Irvine, CA (US); Jeffrey Seiichi Matayoshi, Irvine, CA (US)

(73) Assignee: McGraw-Hill Global Education Holdings, LLC, New York, NY (US)

( * ) Notice: Subject to any disclaimer, the term of this patent is extended or adjusted under 35 U.S.C. 154(b) by 218 days.

(21) Appl. No.: 15/856,192

(22) Filed: Dec. 28, 2017

(65) Prior Publication Data

US 2019/0206271 A1  Jul. 4, 2019

(51) Int. Cl.

| A63F 9/24 | (2006.01) |
|---|---|
| G09B 7/00 | (2006.01) |
| G09B 5/06 | (2006.01) |
| G09B 5/08 | (2006.01) |
| G06N 20/00 | (2019.01) |

(52) U.S. Cl.
CPC .............. G09B 7/00 (2013.01); G09B 5/06 (2013.01); G09B 5/08 (2013.01); G06N 20/00 (2019.01)

(58) Field of Classification Search
CPC ............. G06N 20/00; G09B 5/06; G09B 7/00
See application file for complete search history.

(56) References Cited

U.S. PATENT DOCUMENTS

| 2014/0335497 | A1* | 11/2014 | Gal | G09B 7/00 |
|---|---|---|---|---|
| | | | | 434/323 |
| 2015/0325138 | A1* | 11/2015 | Selinger | G09B 7/00 |
| | | | | 434/322 |
| 2016/0189563 | A1* | 6/2016 | Fried | G09B 19/00 |
| | | | | 434/236 |
| 2017/0163472 | A1* | 6/2017 | Black | H04L 41/0681 |

FOREIGN PATENT DOCUMENTS

CN   108492233 A * 9/2018

* cited by examiner

*Primary Examiner* — Steve Rowland
(74) *Attorney, Agent, or Firm* — Lowenstein Sandler LLP

(57) ABSTRACT

A method and system for detecting negative learning behaviors associated with a student system in an education program environment. Activity information is collected that corresponds to the performance of learning events of the education program. Based on the activity information, a student profile corresponding to the student is generated. One or more features are extracted from the student profile and used by a machine learning model to classify the student profile as a negative learning indicator associated with the student. An alarm notification is generated that correspond to the negative learning behavior indicator.

17 Claims, 6 Drawing Sheets

NEGATIVE LEARNING BEHAVIOR ALERT SYSTEM

BACKGROUND

In today's educational environment, computer-based educational programs track various learning activities or events associated with students participating in an educational program or course. Conventionally, the learning activities (e.g., completion of a chapter, taking a quiz, submission of an answer to question, conducting research, etc.) are identified and recorded by the educational program in a manner that enables an administrator (e.g., a teacher) to check on the "progress" of the individual students.

The tracking the completion of discrete learning activities without analysis of a temporal dimension associated with the activities fails to provide the administrator with an accurate assessment of a student's progress or learning behavior. In many instances, negative learning behaviors are exhibited by students, but continue unidentified and without remediation.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
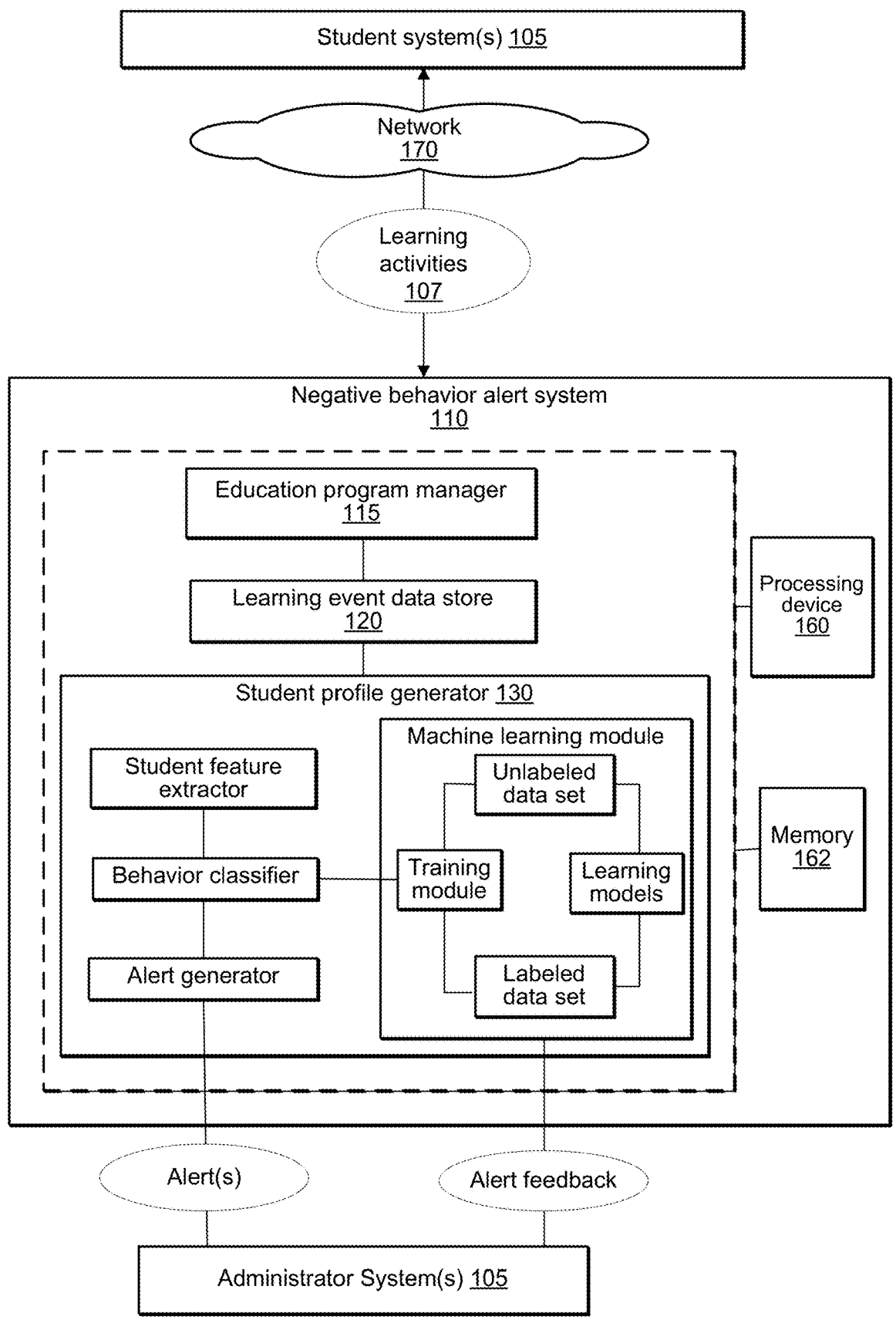
FIG. 1 illustrates an example computing environment including a negative behavior alert system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to identifying problematic or undesirable (i.e., negative) learning behaviors associated with a user (e.g., a student) as it relates to an educational program. The negative learning behaviors may be any behavior that is harmful or detrimental to a student's educational growth and learning outcomes, such as, for example, stalling progress, suspicion of cheating, procrastination, etc. In one embodiment, a student employs a student computing system (also referred to as a "student system" to participate in a computer-based education platform or program (e.g., McGraw-Hill Assessment and Learning in Knowledge Spaces (ALEKS®) system).

In one embodiment, learning activities executed by a student system within an education program are captured and stored by a computing system (herein the "negative behavior alert system"). The negative behavior alert system extracts features associated with the student from the learning activities. The extracted student features are used to generate a student profile associated with the student. In one embodiment, the student profile is a statistical model representing measurements associated with behavioral characteristics associated with the student's learning activities. The characteristics may represent a steadiness measurement associated with the student, wherein the student's learning activities are measured in the context of an underlying time dimension. In one embodiment, the time dimension of the steadiness measurement can be a sequence of equal-time intervals (e.g., a day, a week, a month, or any defined cycle such as a marking period) or a continuum tracking instantaneous interactions occurring after a student login to the online education platform.

In one embodiment, student features identified from the learning activities are used to generate or update one or more machine learning models. The machine learning models are configured to generated validated labelled data for a training set. In one embodiment, labelled data includes exemplary data that has been classified and may be used as an example to "train" the program in classifying new data. In one embodiment, the machine learning models may be applied to student features extracted from identified learning activities to classify the corresponding student into one of multiple possible profiles. For example, a student may be classified into a profile corresponding to a particular negative learning behavior, such as, procrastination, stalling progress, unexpected or suspicious progress indicating potential cheating, etc.

FIG. 1 is a block diagram illustrating various components of a computing environment including a negative behavior alert system 110 operatively coupled to one or more student systems 105 via a network 170. The network 170 may be a suitable communications network including, for example, the Internet, intranets, extranets, wide area networks (WANs), local area networks (LANs), wired networks, wireless networks, or other suitable networks, etc., or any combination of two or more such networks. Student system 105 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In one embodiment, the negative behavior alert system 110 may include an education program manager 115, a learning event data store 120, a student profile generator 130, a processing device 160 and a memory 162 configured to execute and store instructions associated with the functionality of the various components, services, and modules of the negative behavior alert system 110, as described in greater detail below in connection with FIGS. 1-7. In one embodiment, the education program manager 115 of the negative behavior alert system 110 provides access to an education program by the one or more student systems 105. In one embodiment, the education program is administered electronically (e.g., via an online portal or an application, etc.) that provides student systems with educational content and tracks the student systems activities (i.e., learning activities 107 of FIG. 1) relating to the educational content. For example, the education program may include one or more courses or structured curriculum including lectures, assignments, quizzes, tests, exercises, or the like. In one embodiment, the education program may be configured by an education provider and provided via to the student system(s) 105 via the education program manager 115 of the negative behavior alert system 110. In one embodiment, the negative behavior alert system 110 monitors the communications between the student systems 105 and the education program manager 115 and collects relevant learning events in the learning event data store 120 (or accesses a data store associated with the education program executed using a separate server or system).

The learning activities 107 collected based on the student systems 105 interaction with the education program manager 115 may be stored in the learning event data store 120. The learning event data store 120 may be any suitable memory configured to store the learning activities 107 and operatively connect to the education program manager 115 and the student profile generator 130.

In one embodiment, the learning event data store 120 is populated with learning activities and events resulting from the interactions between the education program and the student systems. Exemplary learning activities 107 and events include, but are not limited to, delivering an explanation to the student system, receiving a student system submission of an answer or assignment, etc. In one embodiment, the learning activities may include a discrete event type and a login-time event type. In one embodiment, the discrete event may include an event having a periodic occurrence that is counted. Example discrete events include, but are not limited to, a number of explanations served by the education program manager 115 to a student system during a given time period (e.g., per day, per week, per month, per semester), a number of answers submitted by a student system during a given time period (e.g., per hour, per day, per week, per month, per semester, etc.)

In one embodiment, the login-time activities include events that occur in pairs, wherein a first event of the pair marks a start of an occurrence of a specific learning activity, and a second event of the pair marks an end of the specific learning activity. An example of a login-time learning activity is the reading of explanations by the student, where the first event in a pair is the education program manager 115 serving an explanation, and the second event is the student system closing or exiting the corresponding explanation webpage. A second example of a login-time activity is the solving of problem by the student, wherein the first event is the education program manager 115 serving a problem, and the second event is the student system submitting an answer to the problem. In one embodiment, a characteristic of the login-time activities is that they are reported against a continuum obtained by 'stitching' together multiple login sessions, as detailed below. In one embodiment, particular activities can overlap each other and they can extend over several login sessions. In one embodiment, multiple login sessions may be "stitched" together according to the following expression:

$$t = \sum_{i=1}^{n-1} T_i + t_e,$$

where $t_e$ is the activity time in login session n and $T_i$ is the duration of session i.

In one embodiment, the student profile generator 130 is configured to generate a student profile for each of the respective students based on the student's learning activities 107. In one embodiment, the student profile generator 130 is a functional model that profiles individual students based on their learning activity or event history associated with the education program.

The student profile includes information about the student including measurements of the student's learning behaviors. In one embodiment, the student profile includes a measurement of the student's steadiness as it relates to his or her learning activity (herein referred to as the "steadiness measurement"). In one embodiment, the steadiness measurement associated with the student represents the student's learning activities in the context of an underlying time dimension, as described in greater detail below. For example, the steadiness measurement captures the regularity or uniformity of the student's learning practice with respect to the learning activity tracked by a rate function. In one embodiment, the steadiness measurement may be represented by the following expression:

$$\frac{\int_0^T |f(t) - \mu| dt}{\int_0^T f(t) dt},$$

wherein $\mu$ is a mean value of the rate function $f$. In one embodiment, the steadiness measurement may be a value within a certain range, such as from 0 to 2.

In one embodiment, the student feature extractor associates each event type to a corresponding learning rate function. For example, for a discrete event type, the corresponding rate function maps each period to the number of occurrences of that event type during that period. In another example, for a login-time event type, each occurrence of the activity defines an individual rate function. In one embodiment, the individual rate function r, may be represented by the following expression:

$$r_a(t) = \begin{cases} \dfrac{1}{t_1 - t_0} & \text{for } t \in [t_0, t_1] \\ 0 & \text{otherwise.} \end{cases}$$

In one embodiment, an overall rate of the activity may be generated as a sum of the individual rate functions of all the occurrences of that activity, as represented by the following example expression:

$$r = \sum_{a \in A} r_a$$

In one embodiment, the student feature extractor generates one or more measurements based on the rate functions. The measurements represent the extracted features that are fed to the behavior classifier for profiling the student. In one example, the extracted feature includes the steadiness measurement of the student system, as described in detail above. In one embodiment, the student profile is generated based on statistical models having statistics including the steadiness measurement and other measures derived from the learning activities of the student. In one embodiment, the student profile generator 130 includes a student feature extractor configured to extract features associated with the student from the student's learning activities. Example student features include, but are not limited to, time identifiers associated with student submissions, user session information, login time of a student system (e.g., an amount of time a student system is logged in to the education program manager 115), an amount of time between multiple logins, the identification of learning events (e.g., assignment completions, assignments missed, incomplete tasks, test results, grades, etc.) In one embodiment, the student feature extractor identifies the student's complete learning event history and extracts certain statistics or features that are fed into the behavior classifier. In one embodiment, the behavior classifier is associated with a machine learning module (e.g., a semi-supervised machine learning system that has been trained on the same features from historical data.

In one embodiment, the student profile generator 130 includes a machine learning module configured to apply one or more learning models to provide trained behavior classes for application by the behavior classifier. In one embodiment, the one or more behavior classes produced by the machine learning module are used by the behavior classifier to classify the student behavior based on the student's learning activities. The machine learning module is configured to perform training and retraining phases of the behavior classifier.

In one embodiment, the machine learning module is initialized by training the behavior classifier based on historical data. For example, the learning event data store 120 is populated with student data from past usage of the education program manager 115 and this historical data is processed by the student profile generator 130 to generate a training database including an unlabeled data set (e.g., including features). In one embodiment, the unlabeled data set is processed by the one or more learning models (e.g., statistical models applicable to the data) to label (or classify) the unlabeled data into one of the negative learning behavior types (or a neutral or non-negative behavior classification). Example learning models may include models relating to statistics such as a steadiness as a function of a login learning rate, a steadiness as a function of a daily learning rate, a trend of a login learning rate. In one embodiment, the trend of the login learning rate may be defined by discretizing the measure and computing the slope of a regression line for a resulting set of pair data. In one embodiment, if the time interval for the discretization is small (e.g., one minute), the rate value is determined at an instant in the interval. In one embodiment, if the time interval is large (e.g., one hour), the average rate is computed over the interval.

In one embodiment, a learning model may model negative learning behavior such as "hitting a wall," suspicious behavior (e.g., potential cheating), and procrastination or cramming behavior. For example, hitting a wall behavior may be identified if a student system logs a least five hours of learning login time and it has been twenty-one days since the student system's first login, the student system exhibits the lowest fifth percentile of steadiness measurement for login learning rate, and the student is in the bottom third for the login rate trend.

In another example, suspicious learning behavior may be identified if a student system logs at least five hours of login time and it has been twenty-one days since the student system's first login, the student system exhibits the lowest fifth percentile of steadiness measurement for login learning rate, and the student is in the top third for login rate trend.

In another example, procrastination learning behavior may be identified if a student system logs at least five hours of login time and it has been twenty-one days since the student system's first login, the student system exhibits a middle third of steadiness measurement for the login learning rate, and the student is in the lowest fifth percentile for daily learning rate.

In one embodiment, sample data with provisional labeling applied by the learning models is validated by an expert to generate the labeled data of the training set. In one embodiment, the unlabeled and labeled data are used for the semi-supervised training of the behavior classifier. In one embodiment, the alert feedback received from the administrator system 150 is added to the labeled data set of the machine learning module (e.g., after a secondary validation by in-house experts). In one embodiment, labeled data is updated with the data relating to the validated alerts and their labels (having the profile or not). In one embodiment, the machine learning module associated with the behavior classifier is periodically retrained using the updated training data.

In one embodiment, the student profile generator 130 includes a behavior classifier. The behavior classifier is configured to classify the student into a behavior-based category or class based on the student features (extracted by the student feature extractor). In one embodiment, the different negative behavior classes are generated and defined by the machine learning module. In one embodiment, for each of the negative learning behavior profiles, the behavior classifier generates a probability that the student fits that profile. In one embodiment, the student profile generator 130 includes an alert generator that examines the probabilities and determines whether to generate and transmit an alert for the student profile if it is classified in a negative learning behavior class. In one embodiment, the alert is communicated to an administrator system 150 (e.g., an instructor's system or account). In one embodiment, the administrator system 150 may provide feedback relating to the accuracy or appropriateness of the alert (e.g., an indication or confirmation that the negative learning behavior classification is appropriate). In one embodiment, the labeled training set is updated by the machine learning module with the feedback received from the administrator system to further train the behavior classifier.

Figure 2:
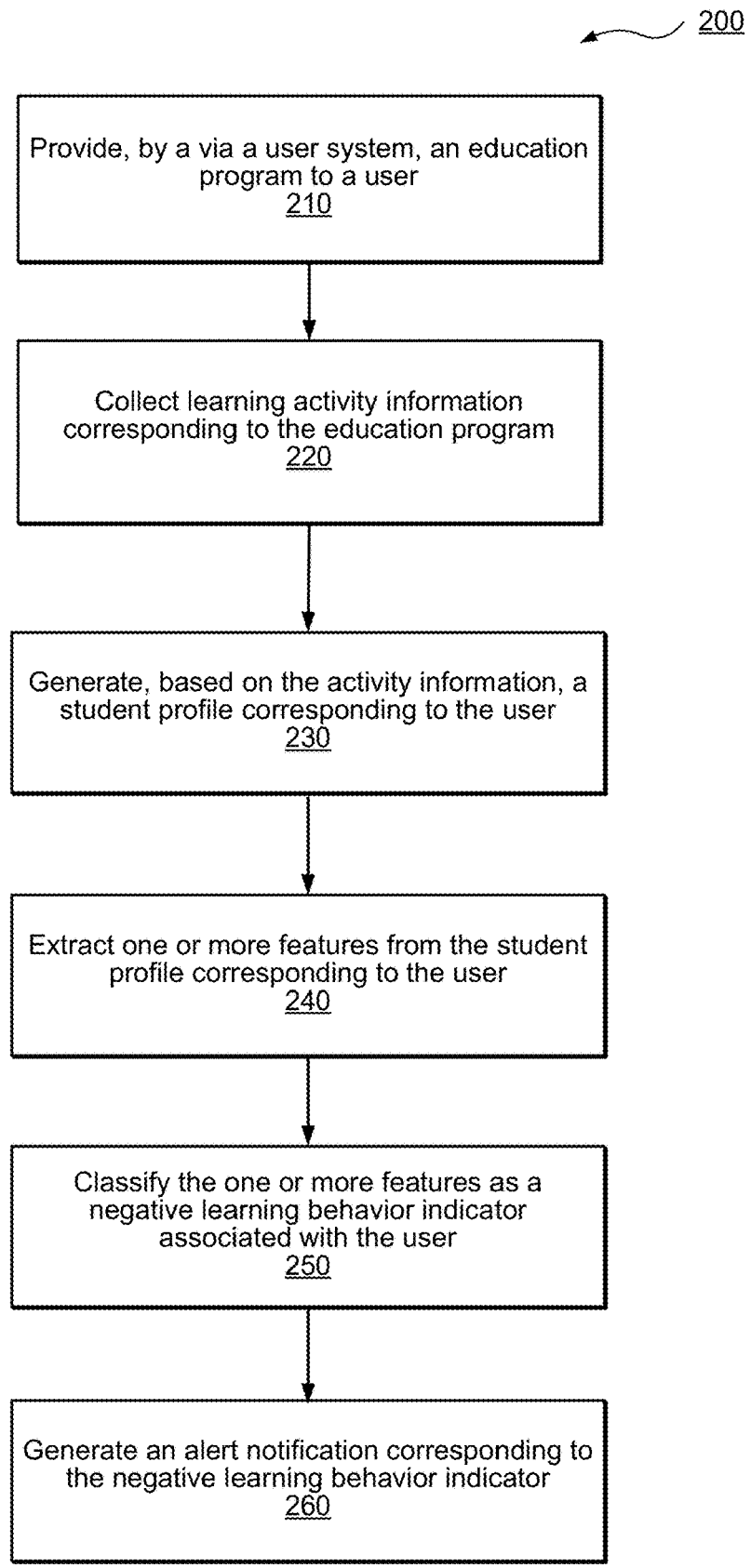
FIG. 2 is a flow diagram illustrating one embodiment of a negative behavior alert process, according to one embodiment.

FIG. 2 illustrates a flowchart that provides an example of a process 200 executed by a system (e.g., the negative behavior alert system 110 of FIG. 1), according to various embodiments. It is understood that the flowchart of FIG. 2 provides an example of the many different types of functional arrangements that may be employed to implement the operation of the negative behavior alert system as described herein. Process 200 may be performed by a processing logic that may comprise hardware (e.g., circuitry, dedicated logic, programmable logic, microcode, etc.), software (e.g., instructions run on a processing device), or a combination thereof.

In block 210, an education program is provided to a user via a user system (e.g., a student system). In one embodiment, the education program is any suitable online or application-based educational program including one or more courses, assignments, tasks, test, activities, etc. that result in the generation of learning activities by the student system. In block 220, learning activities corresponding to the education program are collected. In one embodiment, the various learning activities of multiple student systems are collected for storage in a data store associated with the negative behavior alert system.

In block 230, a student profile is generated based on the activity information associated with a student system. In one embodiment, the student profile includes a collection of the student learning activities collected over a period of time. In block 240, one or more features are extracted from the student profile corresponding to the student system. Example features include statistics associated with events and behaviors exhibited by the student system, such as a steadiness measurement, as described above. In one embodiment, each event type (e.g., discrete and login-time event types) is associated with a corresponding learning rate function. For example, discrete events are associated with a rate function that maps each period to a number of occurrences of that discrete event during that period. In another example, for a login-time event type, each occurrence of the activity defines an individual rate function.

In block 250, the one or more features are classified as a negative learning behavior indicator associated with the student system. In one embodiment, multiple negative learning behavior classifications or categories are established by the system (e.g., a procrastination category, a suspicious learning category, a 'hitting a wall' category, etc.) The student profile is analyzed to determine if the student profile is to be classified in one of the negative learning behavior categories.

In block 260, in response to the negative learning behavior indicator representing a classification of the student profile into one of the negative learning behavior categories, an alert notification is generated that corresponds to the identified negative learning behavior indicator. In one embodiment, different alert notifications may be configured for the different negative learning behavior indicators. For example, a severity level may be assigned to each of the various negative learning behavior classifications with corresponding instructions associated with the alert notification (e.g., where to send the alert, when to send the alert, a frequency of the alert, etc.)

Figure 3:
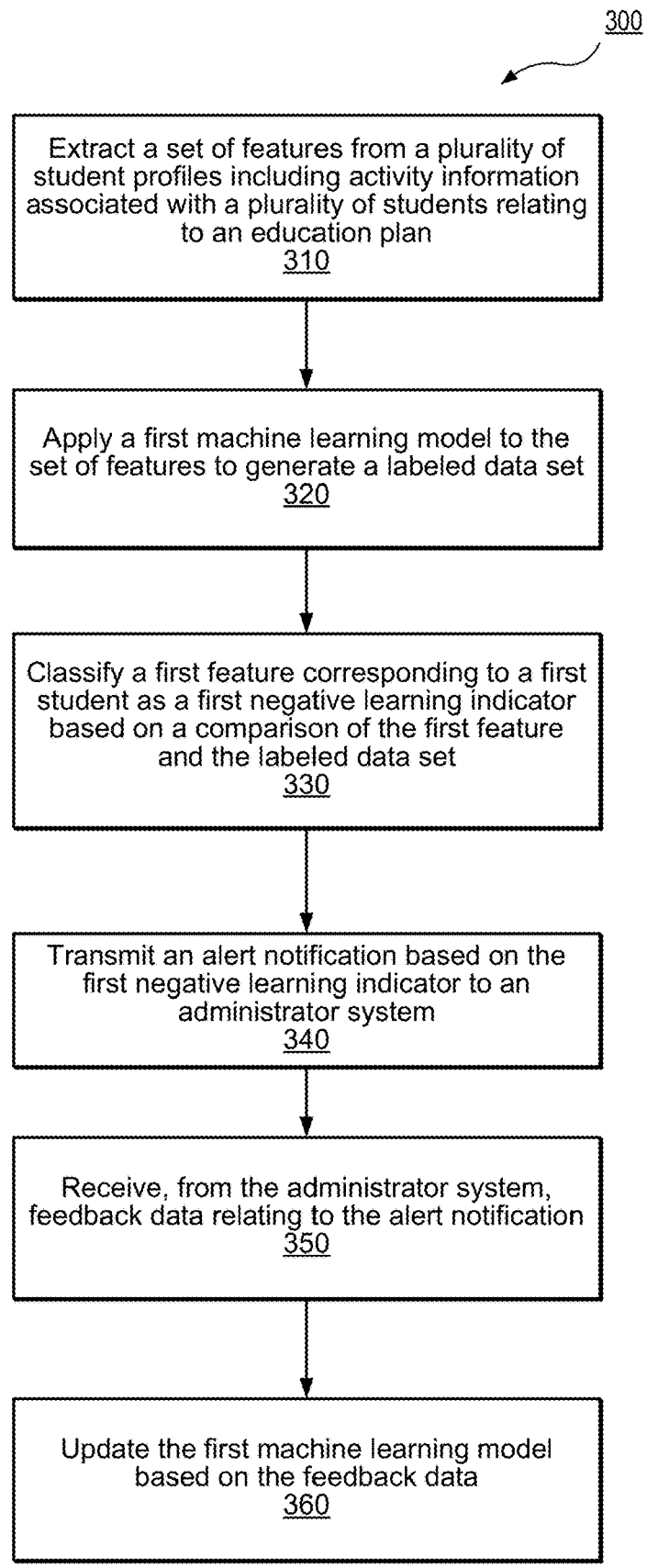
FIG. 3 is a flow diagram illustrating one embodiment of a negative behavior alert process, according to one embodiment.

FIG. 3 illustrates a flowchart that provides an example of a process 300 executed by a system (e.g., the negative behavior alert system 110 of FIG. 1), according to various embodiments. In block 310, a set of features are extracted from multiple student profiles including learning activity information associated with a plurality of students relating to an education plan. In block 320, a first machine learning model is applied to the set of features to generate a labeled data set. In one embodiment, the collected learning activities and corresponding features are used to train the machine learning model for use by a behavior classifier to classify student profiles into one or more negative learning behavior categories.

In block 330, a set of features corresponding to a first student (i.e., student system participating in the education program) is analyzed using the trained machine learning model and classified as a negative learning indicator. In one embodiment, the classification is based on a comparison of the set of features and the labeled data set. For example, the set of features may be a steadiness measurement that matches a negative learning behavior class indicating suspicious learning behavior. In this example, the student profile associated with the first student is classified in the suspicious learning class.

In block 340, an alert notification is transmitted to an administrator system based on the first negative learning indicator. In one embodiment, the alert notification may include a communication to a system associated with an administrator. In one embodiment, the alert notification may include information and statistics relating to the first negative learning indicator for review by the administrator. For example, the alert notification may include a listing of the first student system's learning activities, learning rates, events, classifications, history, etc.

In one embodiment, the machine learning model may be configured to generate various alert types, such as, for example, a "no alert" type, or a type associated with particular negative learning behavior (e.g., procrastination behavior, hitting a wall behavior, suspicious behavior).

In block 350, feedback data relating to the alert notification may be received from the administrator system. In one embodiment, the feedback data may include information from the administrator system regarding the accuracy or appropriateness of the identified first negative learning indicator. For example, the feedback data may confirm that the student associated with the first student system does exhibit the negative learning behavior associated with the first negative learning indicator. In another example, the feedback data may reject the classification of the first student system, indicating that the first negative learning indicator was invalid. In embodiments, the feedback data may be positive such that it confirms the indication of a negative learning behavior as it relates to the student.

In block 360, the first machine learning model is updated based on the feedback data. For example, changes may be made to the labeled data set based on the feedback data, such that labels, weights, classifications, correlations, etc. are adjusted, changed, modified, etc. in view of the feedback data. In one embodiment, the feedback data enables the first machine learning model to be further trained (or re-trained) to improve the labeling of data and the classifications applied to student profiles by the behavior classifier. In one embodiment, the re-training may be based on negative feedback (e.g., feedback indicating that the classification of a student as exhibiting a negative learning behavior is inaccurate or inapplicable) or positive feedback (e.g., feedback indicating that the classification of a student as exhibiting a negative learning behavior is accurate).

Figure 4:
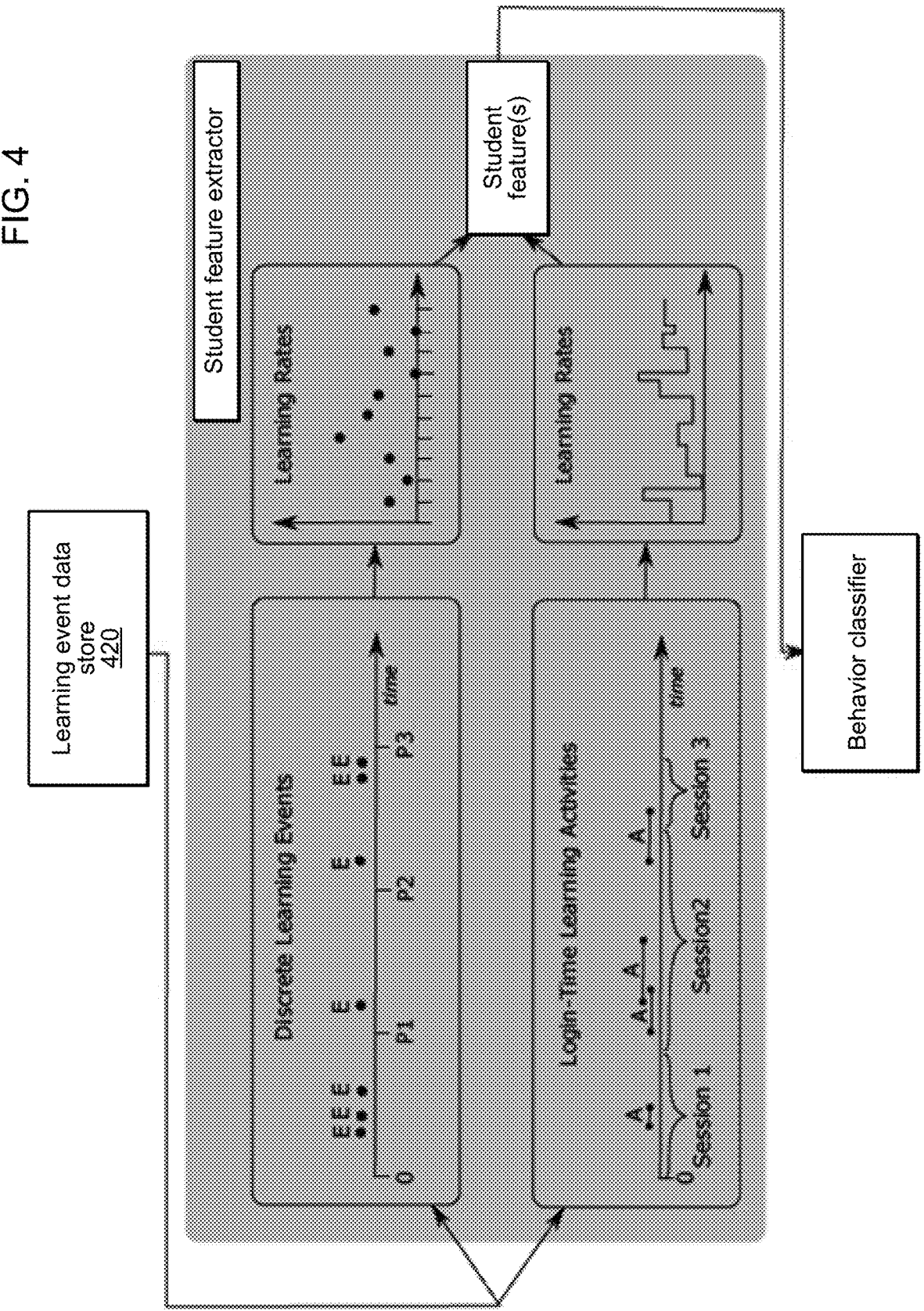
FIG. 4 is an example portion of a process flow relating to the monitoring and extracting of learning activities, according to one embodiment.

FIG. 4 illustrates an example block diagram including components of a negative learning behavior alert system, according to embodiments of the present disclosure. As illustrated, a learning event data store 420 stores learning activities associated with one or more student systems. Those learning activities are provided to an operatively connected student feature extractor configured to identify discrete learning events and login-time learning activities. As illustrated, the discrete learning events (represented by the symbol "E" in FIG. 4) are mapped with a time component to generate a discrete learning rate function. In one embodiment, various intervals of time between points in time (e.g., P1, P2, P3) may be tracked as it relates to the occurrences of the discrete learning events.

In one embodiment, a time-based graph may be generated for the login-time learning activities (e.g., represented by the symbol "A" in FIG. 4). As shown, the login-time learning activities may be tracked with respect to various user sessions (e.g., session 1, session 2, session 3) of the student system to determine a login-time continuous learning rate function.

In one embodiment, the student feature extractor generates a learning rate (using a learning rate function, as described above) for the discrete learning events and the login-time learning activities. The learning rates corresponding to a student profile may then be used to identify student features that may be provided to the behavior classifier for classification purposes. In one example, the student features may be analyzed by the behavior classifier using one or more learning models to determine if the student profile matches a negative learning behavior type.

Figure 5A:
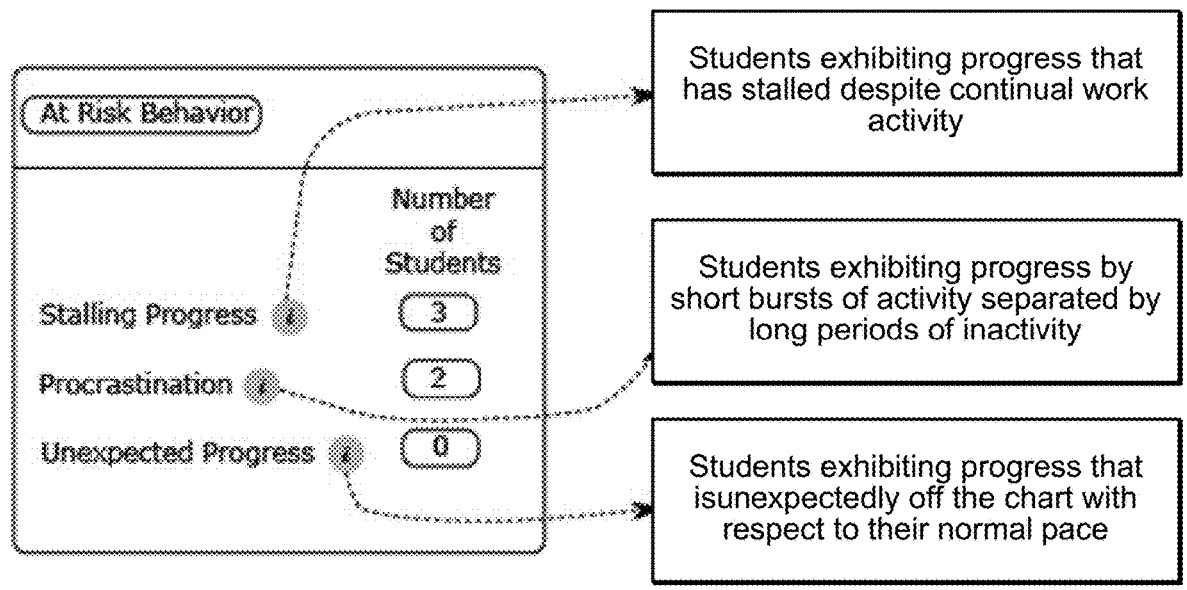
FIGS. 5A and 5B illustrate example interfaces relating to a negative behavior alert system, according to one embodiment.
Figure 5B:
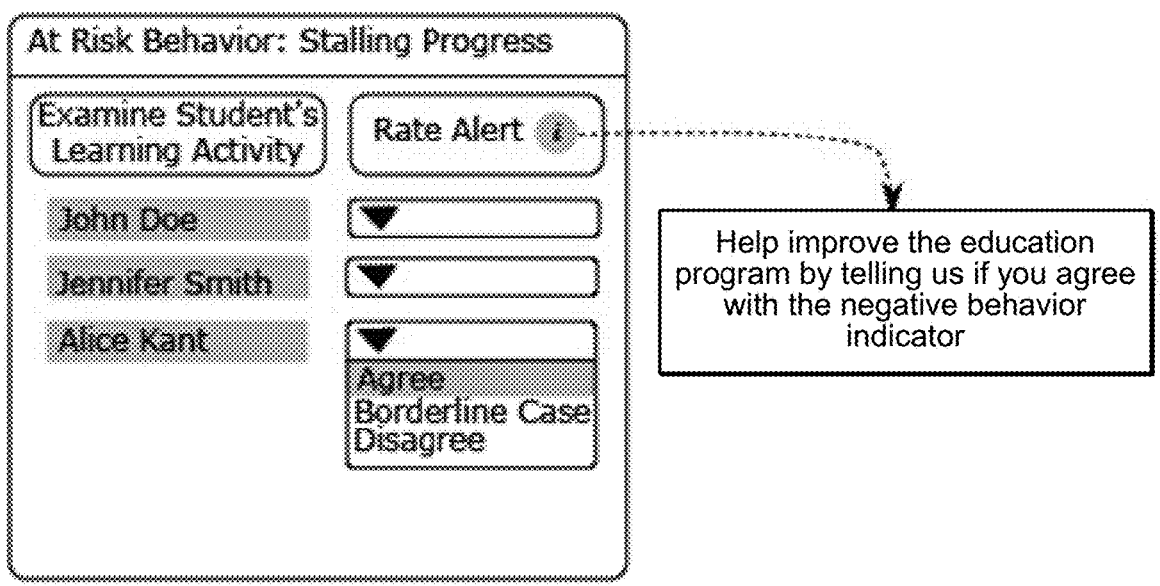

FIGS. 5A and 5B illustrate exemplary displays or interfaces that may be generated in accordance with embodiments of the present disclosure. In one embodiment, the interfaces shown in FIGS. 5A and 5B may be generated as part of the alert notifications relating to the classification of student profiles into one or more negative learning behavior categories. For example, as shown in FIG. 5A, the interface displays numbers of student profiles that match the respective negative learning behavior categories (e.g., stalling progress, procrastination, unexpected progress) along with an information icon that may be interacted to provide further information relating to the corresponding behavior category. In FIG. 5B, the interface provides a user with a portal to provide feedback relating to the negative learning behavior indicators. As shown, the administrator system is able to provide feedback (e.g., "agree," "borderline case," "disagree") for each of the student profiles (e.g., John Doe, Jennifer Smith, and Alice Kant) as it relates to the identified negative learning behavior (e.g., stalling progress). As shown in FIG. 5B, an informational icon may be provided that, when interacted with by the user (e.g. hovering or clicking on the icon) provides information associated with the feedback data and its use to improve the accuracy of the diagnostics generated by the negative behavior alert system.

Figure 6:
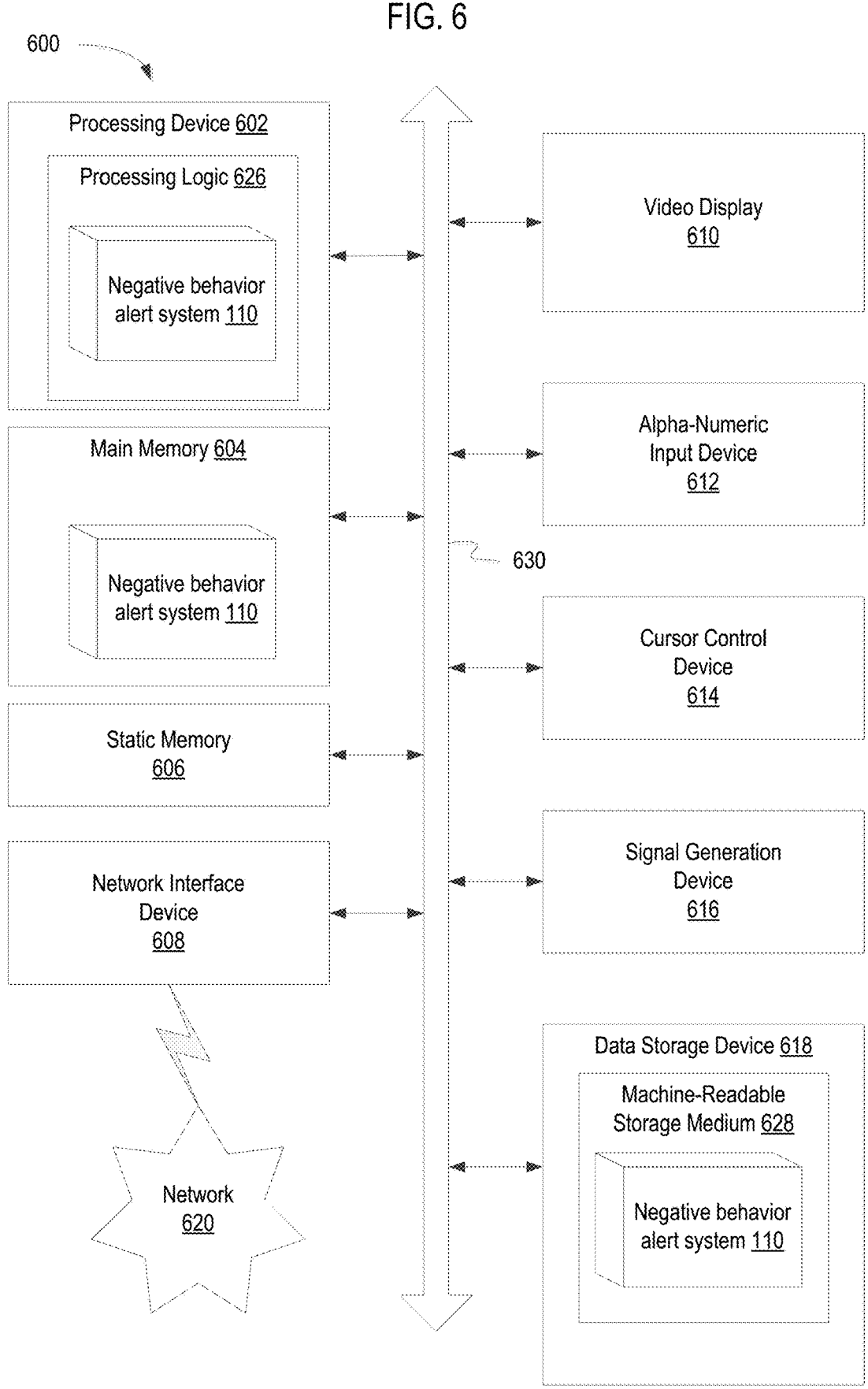
FIG. 6 is a schematic block diagram that provides an example illustration of a computing environment executing instructions relating to a neural network, according to one embodiment.

FIG. 6 illustrates a diagrammatic representation of a machine in the example form of a computer system 600 including a set of instructions executable by a negative behavior alert system 110 to enable the system to perform any one or more of the methodologies discussed herein. In one embodiment, the negative behavior alert system 110 may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the negative behavior alert system 110 for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the negative behavior alert system 110 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "classifying", "providing", "collecting", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a processing device of an education system, an education program to a plurality of user systems;
   collecting activity information corresponding to performance by the plurality of user systems of learning events of the education program;
   extracting a set of features from the activity information, wherein the set of features comprise a time-based measurement associated with the education program;
   applying a machine learning model to the set of features to generate a labeled data set associated with a negative learning indicator;
   generating, based on the activity information, a student profile corresponding to a first user system;
   extracting a first set of features from the student profile corresponding to the first user system;
   comparing the first set of features to the labeled data set to generate comparison data;
   classifying, using the comparison data, the first set of features of the student profile as the negative learning indicator; and
   generating an alarm notification corresponding to the negative learning behavior indicator associated with the student profile.

2. The method of claim 1, further comprising causing a display of the alarm notification to an administrator system.

3. The method of claim 2, further comprising receiving alert feedback from the administrator system, wherein the alert feedback indicates an assessment of the negative learning behavior indicator as it relates to the student profile.

4. The method of claim 3, wherein the machine learning model is updated based on the alert feedback received from the administrator system.

5. The method of claim 1, wherein the negative learning indicator comprises one of a stalling progress indicator, a procrastination indicator, or an unexpected progress indicator.

6. The method of claim 1, wherein the learning events comprise at least one of a discrete learning event or a login-time learning event.

7. A system comprising:
   a processing device; and
   a memory operatively coupled to the processing device, the memory to store computer-executable instructions that, if executed, cause the processing device to:
   provide, by an education system, an education program to a plurality of user systems,
   collect activity information corresponding to performance by the plurality of user systems of learning events of the education program;
   extract a set of features from the activity information, wherein the set of features comprise a time-based measurement associated with the education program;
   apply a machine learning model to the set of features to generate a labeled data set associated with a negative learning indicator;

generate, based on the activity information, a student profile corresponding to a first user system;

extract a first set of features from the student profile corresponding to the first user system;

compare the first set of features to the labeled data set to generate comparison data;

classify, using the comparison data, the first set of features of the student profile as the negative learning indicator; and generate an alarm notification corresponding to the negative learning behavior indicator associated with the student profile.

8. The system of claim 7, the processing device to cause a display of the alarm notification to an administrator system.

9. The system of claim 8, the processing device to receive alert feedback from the administrator system, wherein the alert feedback indicates an assessment of the negative learning behavior indicator as it relates to the student profile.

10. The system of claim 9, wherein the first machine learning model is updated based on the alert feedback received from the administrator system.

11. The system of claim 7, wherein the negative learning indicator comprises one of a stalling progress indicator, a procrastination indicator, or an unexpected progress indicator.

12. The system of claim 7, wherein the learning events comprise at least one of a discrete learning event or a login-time learning event.

13. A non-transitory computer-readable storage device storing computer-executable instructions that, if executed by a processing device, cause the processing device to:

provide, by an education system, an education program to a plurality of user systems;

collect activity information corresponding to performance by the plurality of user systems of learning events of the education program;

extract a set of features from the activity information, wherein the set of features comprise a time-based measurement associated with the education program;

apply a machine learning model to the set of features to generate a labeled data set associated with a negative learning indicator;

generate, based on the activity information, a student profile corresponding to a first user system;

extract a first set of features from the student profile corresponding to the first user system;

compare the first set of features to the labeled data set to generate comparison data;

classify, using the comparison data, the first set of features of the student profile as the negative learning indicator; and generate an alarm notification corresponding to the negative learning behavior indicator associated with the student profile.

14. The non-transitory computer-readable storage device of claim 13, the processing device to cause a display of the alarm notification to an administrator system.

15. The non-transitory computer-readable storage device of claim 14, the processing device to receive alert feedback from the administrator system, wherein the alert feedback indicates an assessment of the negative learning behavior indicator as it relates to the student profile.

16. The non-transitory computer-readable storage device of claim 15, wherein the machine learning model is updated based on the alert feedback received from the administrator system.

17. The non-transitory computer-readable storage device of claim 13, wherein the negative learning indicator comprises one of a stalling progress indicator, a procrastination indicator, or an unexpected progress indicator.

* * * * *